W. EHRHART.
PRETZEL MACHINE.
APPLICATION FILED FEB. 15, 1912.
1,133,249.
Patented Mar. 23, 1915.
3 SHEETS—SHEET 1.
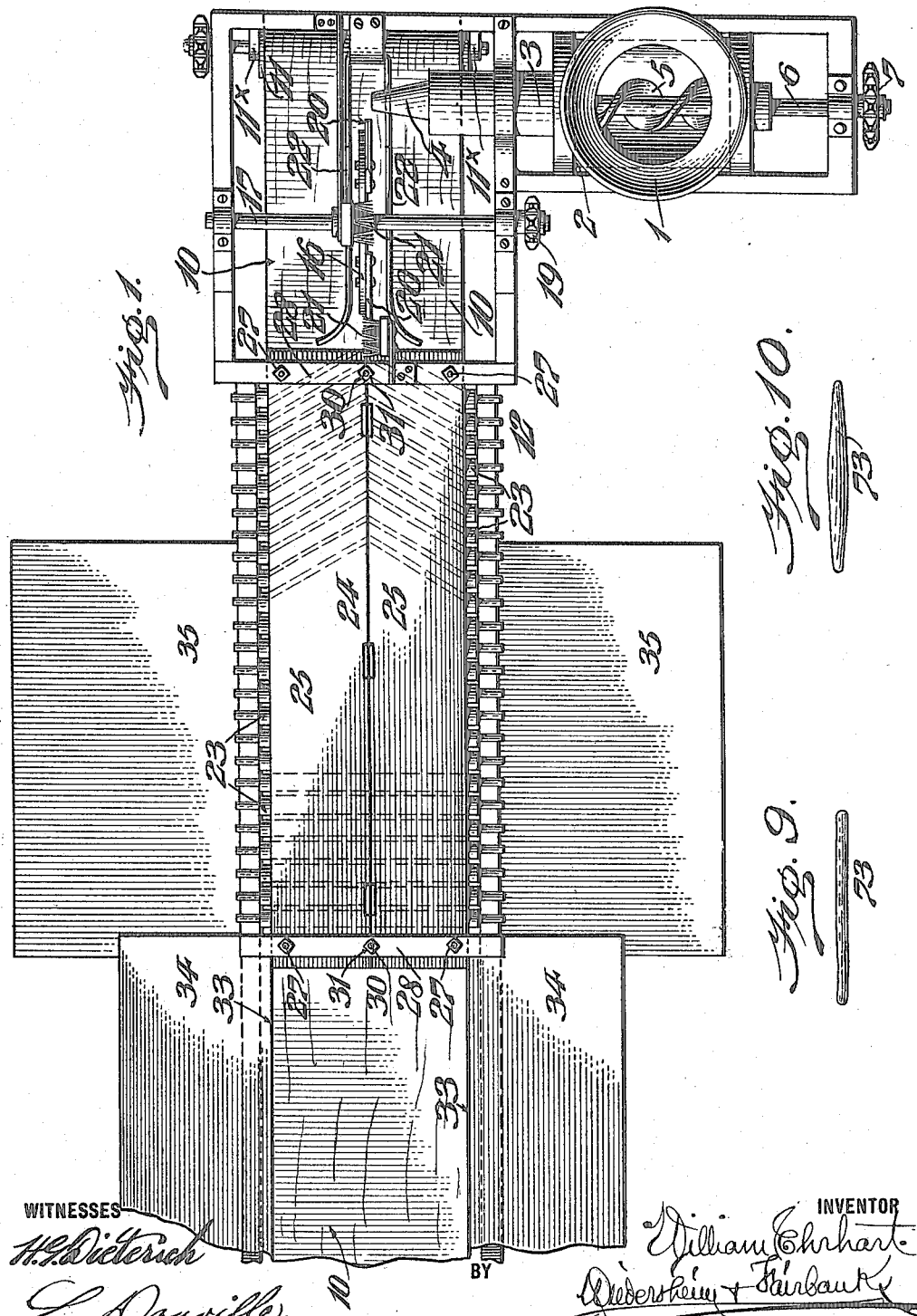

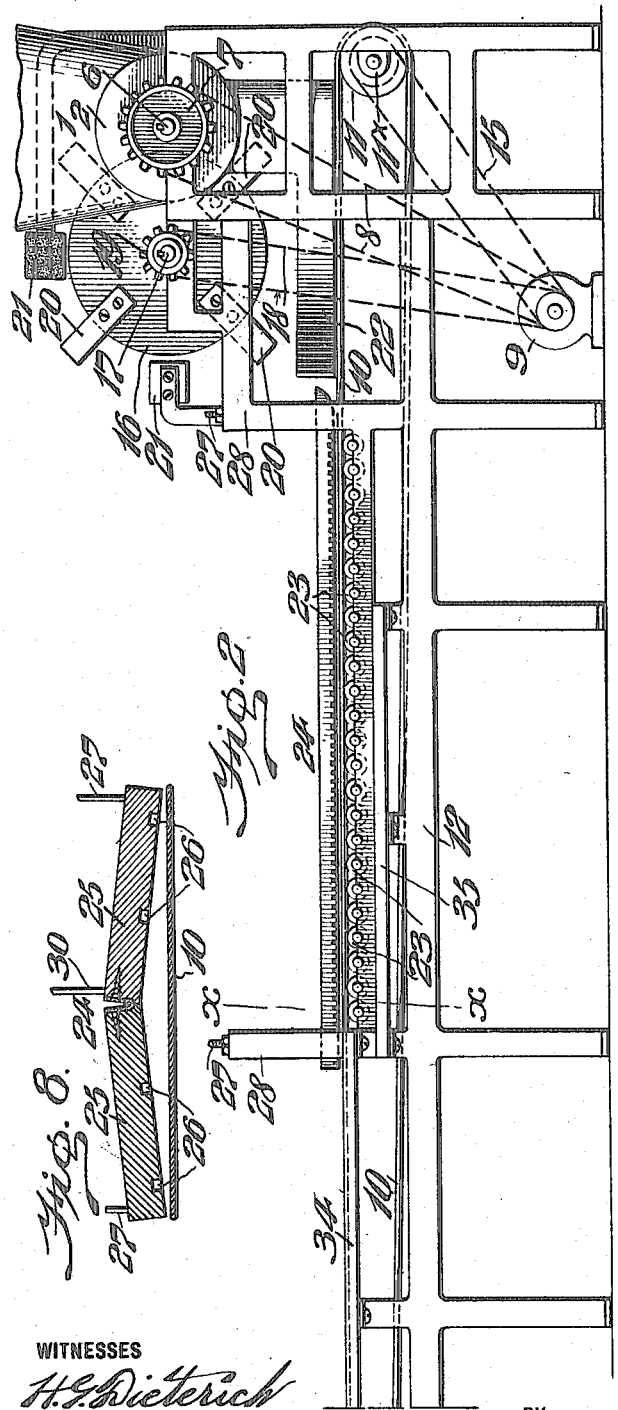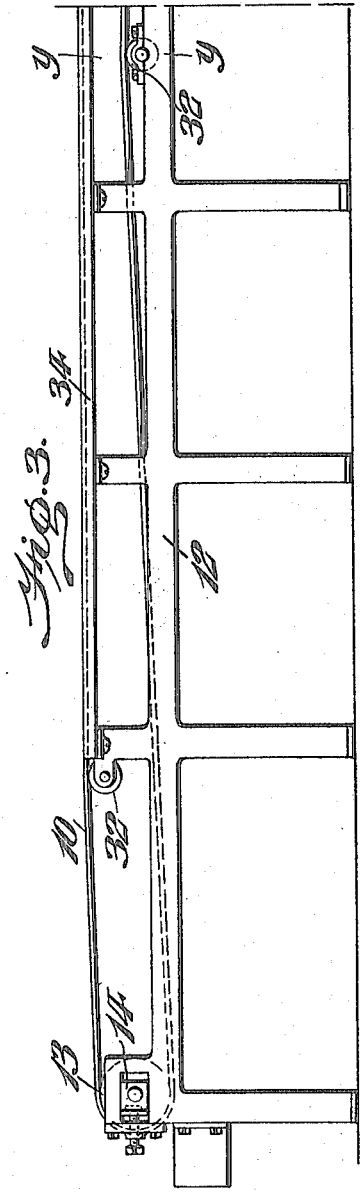

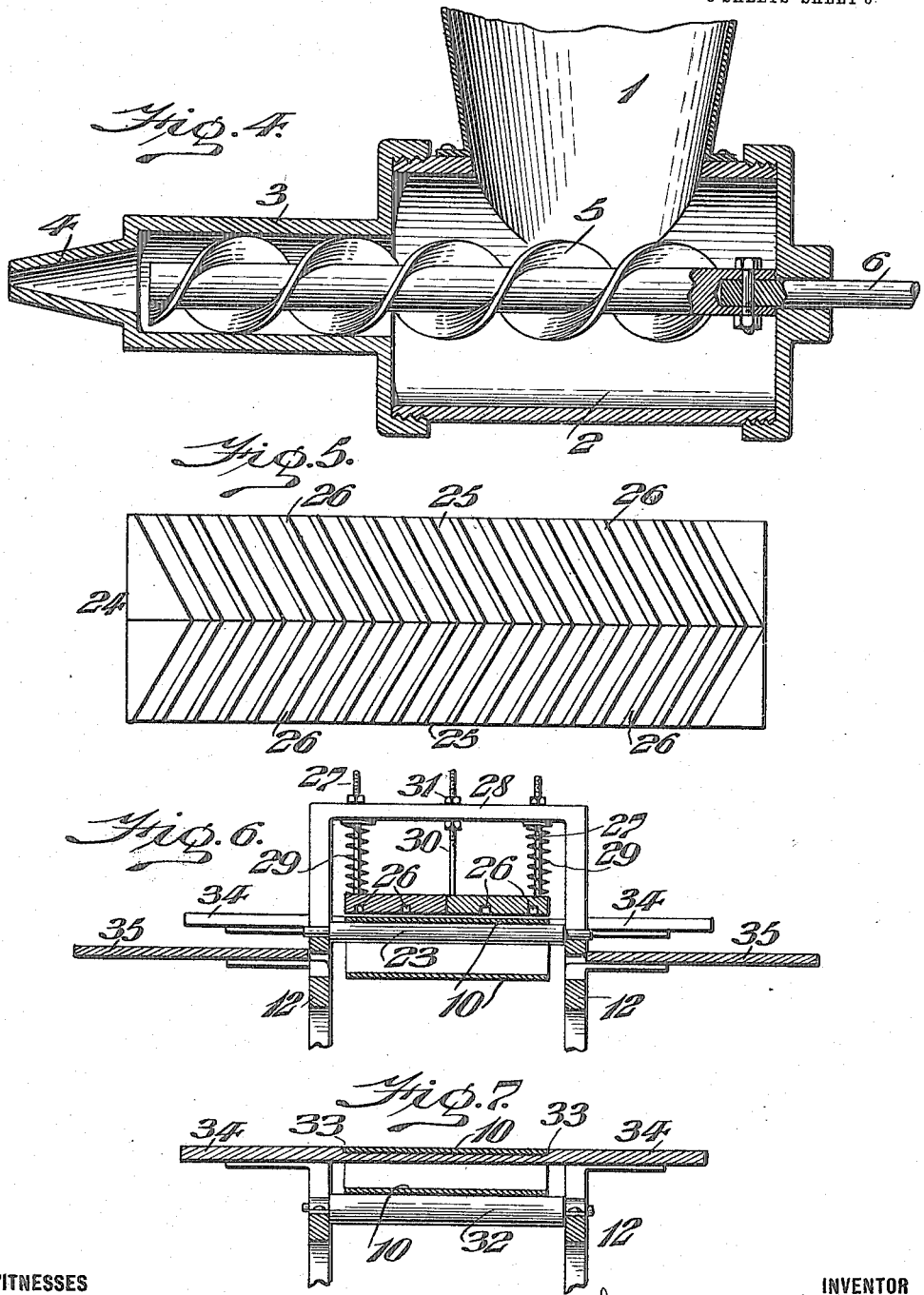

UNITED STATES PATENT OFFICE.

WILLIAM EHRHART, OF PHILADELPHIA, PENNSYLVANIA, ASSIGNOR TO HYMON EHRHART, OF LANCASTER, PENNSYLVANIA.

PRETZEL-MACHINE.

1,133,249.  Specification of Letters Patent.  Patented Mar. 23, 1915.

Application filed February 15, 1912. Serial No. 677,756.

*To all whom it may concern:*

Be it known that I, WILLIAM EHRHART, a citizen of the United States, residing in the city and county of Philadelphia and State of Pennsylvania, have invented a new and useful Pretzel-Machine, of which the following is a specification.

My invention consists of a machine for dividing dough and rolling the same into narrow rolls from which pretzels may be formed.

It further consists of means for dividing the dough into uniform pieces.

It further consists of means for cleaning the cutters dividing the dough.

It further consists of means for rolling the severed pieces of dough into long rolls which may be twisted into the form of pretzels.

It further consists of means for varying the shape of such rolls.

It further consists of other novel features of construction all as will be hereinafter fully set forth.

The invention is satisfactorily illustrated in the accompaying drawing, but the important instrumentalities thereof may be varied, and so it is to be understood that the invention is not limited to the specific arrangement and organization shown and described.

Figure 1 represents a top plan view of my improved pretzel machine. Fig. 2 represents a side elevation of the feed end of the machine. Fig. 3 represents a side elevation of the delivery end of the machine. Fig. 4 represents an axial section of the feeding device. Fig. 5 represents a plan view of the rolling board. Fig. 6 represents a cross section on the line $x$—$x$ in Fig. 2. Fig. 7 represents a cross section on the line $y$—$y$ in Fig. 3. Fig. 8 represents a cross section of the apron and rolling board. Figs. 9 and 10 represent views of two forms of rolls or blanks for pretzels as made by the machine.

Similar numerals of reference indicate corresponding parts in the figures.

Referring to the drawings, the numeral 1 indicates a hopper into which the dough is fed, and the lower end of which opens into a cylindrical chamber 2, which is continued in a tube 3, having a tapering nozzle 4, at its outer end. A helix or feed-screw, 5, has its shaft, 6, journaled in the rear head of the cylindrical chamber and fits in the tube, and said shaft carries a sprocket-wheel, 7, or a band-pulley which derives motion by a chain, 8, or a belt from a motor 9, or other suitable or convenient source of rotary motion.

An endless apron 10, travels around a roller, 11, journaled in bearings 11$^x$ at the feed end of the machine-frame, 12, and around a roller, 13, journaled in bearings, 14, at the discharge end of the machine frame, and said first roller derives rotary motion by means of a chain or belt, 15, from the motor. A wheel, 16, secured upon a shaft, 17, parallel with the feed-screw, which shaft derives rotary motion from the motor by a chain or belt, 18, and a sprocket-wheel or pulley 19. Cutters, 20, are radially secured upon said wheel to extend across the end of the nozzle of the feeding device, so that, as the wheel revolves and the dough is forced out through the nozzle, the cutters will sever lumps of dough as the latter is forced through the nozzle. Brushes, 21, are secured upon the machine-frame at opposite sides of the path of the cutters so as to brush off any particles of dough adhering to the same.

The dough feeding means disclosed form no part of the present invention, but are illustrated for the purpose of showing one form of feeding-mechanism.

Parallel guide-plates, 22, are supported in the machine-frame, above the apron and beneath the nozzle and cutter-wheel, and serve to guide the severed lumps of dough. A portion of the traveling apron is supported by a series of rollers, 23, and a rolling-board 24, composed of two boards, 25, hinged together at their inner or middle edges, is supported above the apron at a distance above the same equal to the desired thickness of the pretzel blank. The board-sections have oblique grooves, 26, in their under sides, which converge at the hinge-edges, forming V-shaped grooves pointing toward the feed end of the machine. The two-sections of the rolling board have upright rods, 27, which slide in openings in upright frames, 28, upon the machine-frame and have springs, 29 coiled around them, and rods 30, project upward from the hinge-edges of the board-sections and pass through the middles of the cross-pieces of the frame and have nuts, 31 upon their screw-threaded ends, so that the sections may be adjusted to lie horizontally or upwardly converging, as illustrated in Fig. 8. The apron is supported against sagging by rollers, 32, journaled at suitable points in the frame. At the discharge end of the rolling-board, the apron is guided in a groove or recess, 33, in the top of the frame, and tables 34, are provided at the sides of said recess, upon which the operatives rest the blanks while twisting them into the conventional pretzel shape. Tables, 35, may be arranged at the sides of the apron and rolling board for convenience of the operatives.

In practice, the dough is placed in the hopper of the feeding mechanism, and when the machine is started, the feed-helix will force the dough out at the tapering feed-nozzle. As the roll of dough emerges from said nozzle, the rotating cutters, traversing the end of the nozzle, will cut such dough-roll into lumps which will drop down upon the traveling apron between the guide-plates by which they will be fed beneath the rolling board. The V-shaped grooves in said board will engage the lumps of dough and roll the same out into thin rolls or blanks, 73, by the action of the traveling apron which carries them beneath the board. The apron is at this portion of its travel supported upon the series of transverse rollers 23. As the rolls or blanks travel along, they are drawn out endwise to the length and thickness required according to the size of the lumps fed and the height to which the rolling board is adjusted above the apron, and, when arriving beyond the discharge end of the rolling-board, the blanks are taken from the apron, formed into pretzel-shape upon the tables by the operatives, and further disposed of for treatment and baking.

The blanks may be of substantially the same diameter throughout, as shown in Fig. 9 of the drawings, or thick in the middle with tapering ends, as shown in Fig. 10, for which purpose the sections of the rolling boards are adjusted laterally sloping, as shown in Fig. 8, by adjusting the central rods by their nuts in the cross-pieces of the upright frames.

The size of the lumps of dough cut off at the feed-nozzle may be regulated by adjusting the relative speed of the cutters to that of the feed, and the number of lumps severed in a given time may be adjusted by increase or decrease of speed of the feed and the cutters.

By constructing the dough-feeder with a large diameter cylinder and a small diameter tube into which the feed-helix fits to turn, I am enabled to feed a comparatively large quantity of dough into the feeder and feed the same freely and continuously. I have found from experience that if dough is fed into a cylinder having the same interior diameter as the exterior diameter of the helix, the feeder will choke unless some means, like a plunger is employed to force the dough into the cylinder, but when I employ a cylinder of larger interior diameter than the feed-helix and then feed through a tube or cylinder within which the helix has a moving fit, the dough will not choke the feeder and may be continually placed in the hopper.

Having thus described my invention what I claim as new and desire to secure by Letters Patent, is:—

1. In a machine of the character stated, a traveling apron adapted to carry the lumps of dough, and a rolling board supported to face such apron to roll such lumps between it and the apron, and formed in its working face with V-shaped transverse grooves pointing against the direction of travel of said apron.

2. In a machine of the character stated, a dough-feeder provided with a nozzle through which the dough is expressed, a series of cutters traveling across the end of such nozzle, a traveling apron arranged to receive the severed lumps of dough, and a stationary rolling-board supported to face such apron, and formed in its working face with V-shaped transverse grooves pointing against the direction of travel of said apron.

3. In a machine of the character stated, a traveling apron adapted to carry the lumps of dough, and a rolling-board supported to face such apron to roll such lumps between it and the apron, and consisting of longitudinal sections vertically movably supported above said apron and having their meeting-edges above the median line of the same, and means for moving said edges toward and from said apron for vertically adjusting their relative angles.

4. In a machine of the character stated, a traveling apron adapted to carry the lumps of dough, and a rolling-board supported to face such apron to roll such lumps between it and the apron, and consisting of longitudinal sections having means for vertically adjusting their relative angles, said sections formed with obliquely transverse grooves in their working faces converging toward their meeting edges and pointing in a direction against the direction of travel of said apron.

WILLIAM EHRHART.

Witnesses:
 WM. SECHER,
 JOHN A. WIEDERSHEIM.

Copies of this patent may be obtained for five cents each, by addressing the "Commissioner of Patents, Washington, D. C."